US008272936B2

(12) United States Patent
Walker et al.

(10) Patent No.: US 8,272,936 B2
(45) Date of Patent: Sep. 25, 2012

(54) SYSTEMS AND METHODS FOR DETERMINING A LOTTERY WINNER BASED ON A PLURALITY OF LOTTERY TICKETS

(75) Inventors: Jay S. Walker, Ridgefield, CT (US); Jeffrey Y. Hayashida, San Francisco, CA (US); Russell P. Sammon, San Francisco, CA (US); Zachary T. Smith, Norwalk, CT (US); Gregory J. Scribner, New Milford, CT (US); Stephen C. Tulley, Monroe, CT (US)

(73) Assignee: Walker Digital, LLC, Stamford, CT (US)

( * ) Notice: Subject to any disclaimer, the term of this patent is extended or adjusted under 35 U.S.C. 154(b) by 336 days.

(21) Appl. No.: 12/425,899

(22) Filed: Apr. 17, 2009

(65) Prior Publication Data

US 2010/0203942 A1 Aug. 12, 2010

Related U.S. Application Data

(60) Provisional application No. 61/045,800, filed on Apr. 17, 2008, provisional application No. 61/045,745, filed on Apr. 17, 2008, provisional application No. 61/081,140, filed on Jul. 16, 2008.

(51) Int. Cl.
*A63F 9/24* (2006.01)
*A63F 13/00* (2006.01)

(52) U.S. Cl. ........................................... 463/17; 463/26

(58) Field of Classification Search .................... 463/17, 463/26

See application file for complete search history.

(56) References Cited

U.S. PATENT DOCUMENTS

| | | | |
|---|---|---|---|
| 7,374,483 | B2 | 5/2008 | Wiltshire |
| 7,520,808 | B1 | 4/2009 | Wolf |
| 7,909,689 | B2 | 3/2011 | Lardie |
| 2004/0137980 | A1 | 7/2004 | Aenlle |
| 2005/0026670 | A1 | 2/2005 | Lardie |
| 2007/0191084 | A1 | 8/2007 | Tarantino |
| 2008/0268938 | A1 | 10/2008 | Doutriaux |
| 2009/0082081 | A1 | 3/2009 | Walker et al. |
| 2011/0070945 | A1 | 3/2011 | Walker et al. |

OTHER PUBLICATIONS http://en.wikipedia.org/wiki/Powerball, Mar. 2001, 22 pages.*

The RotoSource Fantasy Sports Guide “Setting Up or Joining a League: League Varieties”, downnload date Apr. 26, 2012, 2 pp.

* cited by examiner

*Primary Examiner* — William D Coleman

(74) *Attorney, Agent, or Firm* — Michael D. Downs; Fincham Downs, LLC

(57) ABSTRACT

In accordance with some exemplary and non-limiting embodiments, a method, an apparatus and a computer readable medium are provided for receiving a request from at least one lottery player to purchase at least one lottery ticket comprising a plurality of symbols, issuing the at least one lottery ticket to the lottery player, associating the at least one lottery ticket with a lottery team formed of at least one other lottery player associated with at least one other lottery ticket associated with the lottery team, determining an occurrence of a qualifying winning event based on the plurality of symbols of all of the lottery tickets associated with the lottery team, and determining a payout for the lottery team based upon the occurrence of the qualifying event.

15 Claims, 7 Drawing Sheets

314

| | GAME IDENTIFIER 402 | GAME RULES 406 | PAYOUT CRITERIA 1 408 | PAYOUT 1 410 | … | PAYOUT CRITERIA N 412 | PAYOUT N 414 |
|---|---|---|---|---|---|---|---|
| R400-1 | GM-DRAW-001 | "MATCH AT LEAST 3 OF 6 DRAWN NUMBERS…" | 3/6 | $3 | … | 6/6 | TOP PRIZE (TBD) |
| R400-2 | GM-DRAW-002 | "MATCH THE 3 DRAWN NUMBERS IN EXACT ORDER…" | 1/3 | $3 | … | 3/3 | $500 |
| R400-3 | GM-DRAW-003 | "MATCH THE 4 DRAWN NUMBERS IN ANY ORDER…" | 2/4 | $5 | … | 4/4 | $5000 |
| | ⋮ | ⋮ | ⋮ | ⋮ | | ⋮ | ⋮ |
| R400-(N-1) | GM-DRAW-N | "SELECT UP TO TEN NUMBERS FROM THE FIELD OF 1-80…" | 1 SPOT, 1 MATCH | $2 | … | 10 SPOTS, 10 MATCHES | 100,000 |
| R400-N | GM-INSTANT-N | "SCRATCH-OFF THE PLAY AREA. MATCH ANY THREE SYMBOLS…" | N/A | $2 | … | N/A | $1,000 |

FIG. 4

SYSTEMS AND METHODS FOR DETERMINING A LOTTERY WINNER BASED ON A PLURALITY OF LOTTERY TICKETS

CROSS-REFERENCE TO RELATED APPLICATIONS

The present application claims the benefit of U.S. Provisional Patent Application No. 61/045,800, filed Apr. 17, 2008 in the name of Walker, Sammon and Scribner entitled "SYSTEMS AND METHODS FOR DETERMINING A LOTTERY WINNER BASED ON A PLURALITY OF LOTTERY TICKETS". This application is incorporated herein by reference in its entirety.

The present application claims the benefit of U.S. Provisional Patent Application No. 61/045,745, filed Apr. 17, 2008 in the name of Walker, Hayashida, Sammon, Smith, Scribner and Tulley entitled "METHOD OF REGISTERING A PLAYER TO PROVIDE A GIFT AFTER WINNING A LOTTERY". This application is incorporated herein by reference in its entirety.

The present application claims the benefit of U.S. Provisional Patent Application No. 61/081,140, filed Jul. 16, 2008 in the name of Walker, Hayashida, Sammon, Smith, Scribner and Tulley entitled "METHOD OF REGISTERING A PLAYER TO PROVIDE A GIFT AFTER WINNING A LOTTERY". This application is incorporated herein by reference in its entirety.

FIELD OF THE INVENTION

The invention generally relates to play of lottery games.

BRIEF SUMMARY OF THE INVENTION

In accordance with exemplary and non-limiting embodiments of the invention, a computer readable medium is encoded with instructions for directing a processor to receive a request from at least one lottery player to purchase at least one lottery ticket comprising a plurality of symbols, issue the at least one lottery ticket to the lottery player, associate the at least one lottery ticket with a lottery team comprising at least one other lottery player associated with at least one other lottery ticket associated with the lottery team, determine an occurrence of a qualifying winning event based on the plurality of symbols of all of the lottery tickets associated with the lottery team and determine a payout for the lottery team based upon the occurrence of the qualifying event.

In accordance with another exemplary and non-limiting embodiment of the invention, a method comprises receiving a request via a computing device in communication with a network from at least one lottery player to purchase at least one lottery ticket comprising a plurality of symbols, issuing the at least one lottery ticket to the lottery player, associating, via the computing device, the at least one lottery ticket with a lottery team comprising at least one other lottery player associated with at least one other lottery ticket associated with the lottery team, determining, via the computing device, an occurrence of a qualifying winning event based on the plurality of symbols of all of the lottery tickets associated with the lottery team, and determining, via the computing device, a payout for the lottery team based upon the occurrence of the qualifying event.

In accordance with exemplary and non-limiting embodiments of the invention, a computer readable medium is encoded with instructions for directing a processor to receive and store registration information comprising a gift provider, at least one gift recipient, and at least one gift associated with each of the at least one gift recipient, receive an indication of a qualifying condition associated with an outcome of a lottery game, determine the occurrence of the qualifying condition, and provide the at least one gift to the at least one gift recipient.

In accordance with another exemplary and non-limiting embodiment of the invention, a method comprises receiving, via a computing device in communication with a network, and storing registration information comprising a gift provider, at least one gift recipient, and at least one gift associated with each of the at least one gift recipient, receiving, via the computing device, an indication of a qualifying condition associated with an outcome of a lottery game, determining, via the computing device, the occurrence of the qualifying condition, and providing, via the computing device, the at least one gift to the at least one gift recipient.

BRIEF DESCRIPTION OF THE DRAWINGS

FIG. 4 is a diagram of an exemplary and non-limiting embodiment of a database according to the disclosure.

DETAILED DESCRIPTION OF THE INVENTION

Figure 1:
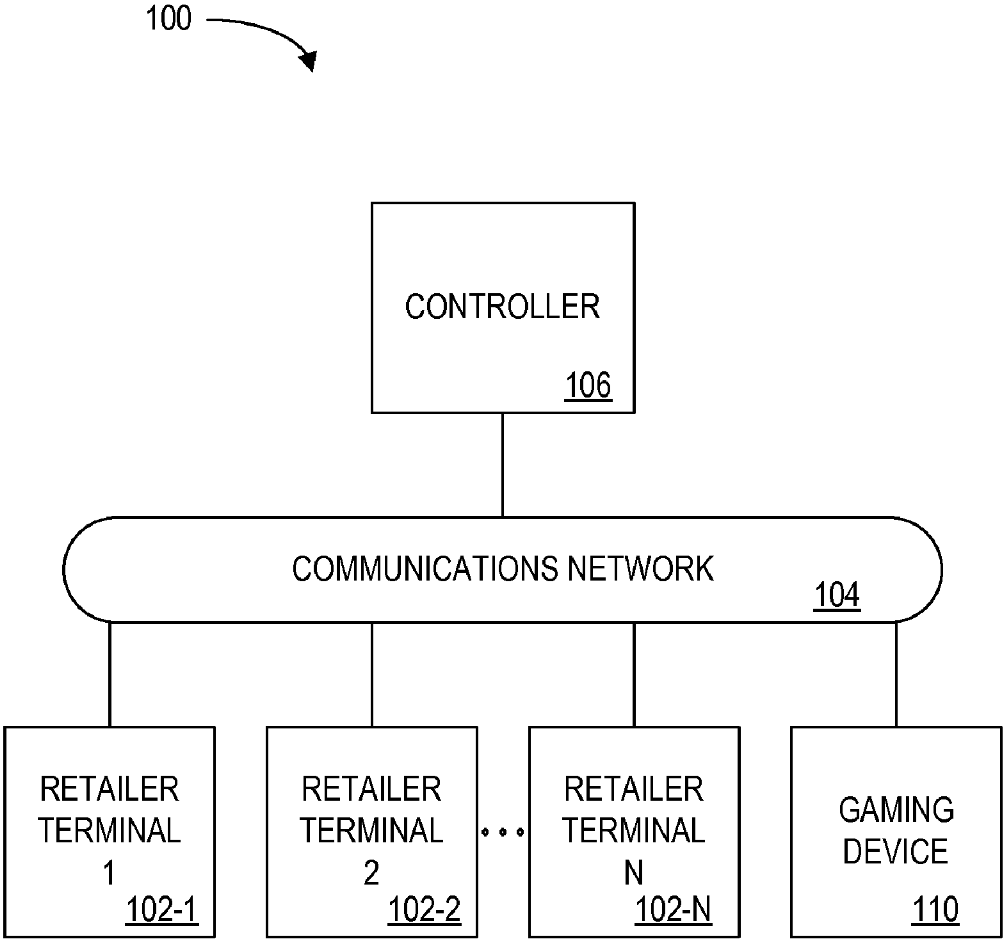
FIG. 1 is a diagram of an exemplary and non-limiting embodiment of a system according to the disclosure.

In accordance with exemplary and non-limiting embodiments, there are disclosed herein, among other things, methods and an apparatus for a lottery player (e.g., a recipient of a lottery entry or ticket) to participate in a secondary game (e.g., for a chance to win additional prizes).

According to some non-limiting embodiments, a lottery player may participate in a secondary game with at least one other ticket holder by combining at least one symbol from each of their respective tickets (e.g., each of three Pick-6 lottery entries).

In another exemplary embodiment, a lottery team comprised of a plurality of players may be formed prior to a drawing by associating lottery tickets with one another (e.g., through a lottery terminal, a Web site, etc.). Players may keep their original tickets, as well as any winnings from those individual tickets. However, each ticket associated with the team may also have the opportunity to win additional prizes by combining their symbols and comparing to the drawn numbers. Therefore, it may be significantly more likely that the players will win as a group. If the group does win, the prize may be shared among members of the group. As used herein, a "Mix-and-Match Lottery Option" (MMLO), refers to an option provided to a player to combine any or all of the symbols forming at least one lottery ticket with some or all of the symbols on at least one other lottery ticket for the purpose of winning prizes or other remuneration.

In some non-limiting embodiments, players may pool their tickets into a "best ball" type game, whereby each player in the group may qualify to receive or share a prize amount based on the best-performing ticket from within the group.

According to other exemplary and non-limiting embodiments, information associated with one or more winning lottery outcomes may be transmitted to, received by and stored by a player's personal device (e.g., a computer, a cell phone, etc). In some embodiments, the information associated with one or more winning lottery outcomes may be output by a lottery retailer terminal. For example, a lottery agent may receive a lottery ticket from a player and insert the ticket into a lottery retailer terminal to determine whether the ticket has won (e.g., individual ticket, or a combined ticket symbols win).

As used herein, a "player" may refer to a participant in a lottery game. Such participation may be the result of the player purchasing or otherwise acquiring a lottery ticket. As a result, the terms "player" and "ticket holder" may be used interchangeably.

In accordance with some exemplary embodiments, a MMLO may be applied to a set of associated lottery tickets (e.g., 4 individual lottery tickets). The MMLO may enable the ticket holders to participate in a secondary game that combines ticket symbols from each of the tickets for team play in an effort to win additional prizes. In some embodiments, the tickets may be sold to a player from a lottery retailer as pre-packaged tickets (e.g., a booklet of 5 tickets), wherein the tickets may be removable (e.g., perforated edges that allow for an easy removal). For example, a player may want to share the tickets with his or her friends, but may wish to keep the tickets together until he is ready to distribute them. In some embodiments, the associated tickets may be printed as individual tickets from a lottery terminal and given to the player. In such an embodiment, the ticket may offer team identifiers (e.g., team name, an alphanumeric code) and/or an indication the MMLO is activated.

In one exemplary embodiment, a lottery operator controller may determine a qualifying event (e.g. if the team outcome is a winning or losing outcome) after receiving a lottery identifier.

In accordance with other exemplary and non-limiting examples, individual tickets may be purchased for use with a MMLO whereby the individual ticket is not created being associated with other one or more other tickets. For example, Mike visits his local convenience store and asks the store clerk for a lottery ticket for Friday night's drawing. The clerk asks Mike if he would like to add a Mix-and-Match team play feature for an additional $1. The clerk further explains about the feature, "Mix-and-Match team play allows you to create a lottery team online where you can invite your friends to participate in a secondary game that combines ticket symbols from each of your team's tickets. It's easier and more fun to win". Mike accepts the offer and pays $1 for the lottery ticket and an extra $1 for the Mix-and-Match team play. Once Mike gets into his office, he visits the Web site shown on his ticket, creates his lottery team and invites his friends for team play.

As used herein, a "social network" refers to a network of individuals that may be mapped based on personal or professional relationships. Examples of a social network may include: a group of friends, a group of co-workers, or a group of individuals with a common interest (e.g., photography). In a preferred embodiment, the term "social network" may refer to one of number of websites known in the art such as: "MySpace", "Facebook", "Friendster", and/or "Linked-In".

As used herein, a "lottery entry" is an entry into a lottery or other game of chance. As used within this disclosure, the phrases "lottery entry" and "entry into a game of chance" shall be synonymous. Other examples of games of chance include casino games like keno, baccarat, blackjack, poker, video poker, and slot machines, as well as sweepstakes like the Publishers Clearinghouse Sweepstakes™.

As used herein, a "lottery outcome" is an outcome resulting from a game of chance. A lottery outcome may involve choosing one or more winners by randomly selecting from a set of entries, or may be of the instant win type (E.g., Massachusetts State Lottery's "Fabulous Fortune" instant game ticket). A winning lottery outcome may also be associated with matching one or more indicia with a set of randomly generated indicia.

As used herein, a "lottery authority" is an entity primarily responsible for the operation and oversight of various lottery hardware, software, data and/or systems as described herein. As previously described, a lottery authority may also perform one or more functions, as described herein, associated with a "facilitator."

As used herein, a "lottery retailer" is a location at which one or more of the following may take place, such as via a lottery retailer terminal 102:

- A beneficiary may register for a lottery outcome
- A lottery ticket may be purchased
- A voucher/coupon for a lottery entry may be redeemed
- A winning lottery ticket may be verified and redeemed for an eligible prize Some lottery retailers may not provide all of these services, and it is possible that different lottery retailers may be used for different services. A lottery retailer may include e.g.,: a convenience store, a gas stations, and/or supermarket.

As used herein, a "Merchant" is a business or storefront that engages in consumer trade. A merchant may provide an advertisement to a facilitator for a product or service sold by the merchant or that is associated with the merchant.

As used herein, a "social network" database is a database associated with a social networking service provider. For example, a social network database may store registrant information, as well as an indication of relationships between one or more registrants. For example, Alice is a "colleague" of Bob and a "friend" of Carl. Existing social networking websites such as "MySpace", "Facebook", "Friendster", "LinkedIn", and "Orkut" may store or otherwise utilize one or more social network database(s) to facilitate interactions between their members.

With reference to FIG. 1, there is illustrated a network environment system 100 for practicing exemplary and non-limiting embodiments disclosed herein. System 100 may comprise a plurality of lottery retailer terminals 102-1 to 102-N, a communications network 104, at least one gaming device 110, and a controller 106. Generally, any or all of the retailer terminals 102-1 to 102-N may operate to: (i) receive information associated with one or more lottery tickets including such data as: (a) ticket and/or lottery entry identifier(s), (b) lottery team identifier, (c) ticket association identifiers, (d) entry indicia and (d) team prize awards based on matches (e.g., "Match 5 Symbols from 3 tickets and receive $50); (ii) transmit any or all of the received information to the controller 106 via the communications network 104; and (iii) output information including such data as: (d) information defining lottery entries and (e) information associated with one or more team prize awards or benefits.

In accordance with exemplary embodiments, each retailer terminal 102-1 to 102-N corresponds to (or is associated with) a particular lottery retailer. For example, lottery retailer terminal 1 (102-1) may be associated with a first lottery retailer such as a convenience store, and lottery retailer terminal 2 (102-2) may be associated with a second lottery retailer such as a supermarket. It should be understood that any number of lottery retailer terminals might be employed in a system 100, along with any number of corresponding controllers 106. In some embodiments, a manufacturer of prepackaged lottery tickets may retrieve information associated with one or more lottery tickets during a manufacturing process (e.g., when producing lottery booklets, group and/or ticket identifiers may be retrieved and applied to generated tickets) using a lottery retailer terminal 102 or manufacturing equipment that consists of lottery retailer terminal functionality.

The controller 106 may operate to: (i) receive and store information associated with one or more lottery tickets including such data as: (a) ticket and/or lottery entry identifier(s), (b) lottery team identifier, (c) ticket association identifiers, (d) entry indicia and (d) team prize awards based on matches (e.g., "Match 5 Symbols from 3 tickets and receive $50); (ii) determine team prize awards associated with two or more associated lottery tickets; and (iii) dividing the team prize award among team players; (iii) receive a redemption request associated with at least one of the lottery tickets, as will be described more fully below.

In some exemplary embodiments, a retailer terminal 102-1 may be configured to perform some or all of the functions of the controller 106. Thus, in some non-limiting embodiments, the controller 106 and the lottery retailer terminal 102-1 (or another given retailer terminal and controller pairing) may be considered as the same "device".

Generally, as explained above, the communications network 104 may comprise or include one or more local and/or wide-area network(s), proprietary and/or public network(s) (e.g., the Internet) for facilitating two-way data communications between the retailer terminals 102-1 to 102-N and the controller 106. The lottery controller 106 may communicate with lottery retailer terminals directly or indirectly, via a wired or wireless medium such as the Internet, via a local area network (LAN), via a wide area network (WAN), via an Ethernet, via a Token Ring, a telephone line, a cable line, a radio channel, an optical communications line, a satellite communications link, or via any appropriate communications means or combination of communications means. Any number and type of devices, including lottery retailer terminals 102 and gaming devices 110, may be in communication with the lottery controller 106, and communication between the devices and the lottery controller 106 may be direct or indirect, such as over the Internet through a Web site maintained by computer on a remote server, or over an online data network including commercial online service providers, bulletin board systems and the like. In some embodiments, the devices may communicate with one another and/or the lottery controller 106 over RF, cable TV, satellite links and the like. A variety of communications protocols may be part of any such communications system, including but not limited to: Ethernet (or IEEE 802.3), SAP, ATP, Bluetooth, and TCP/IP.

In accordance with the disclosed exemplary embodiments, devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server computer may not be necessary and/or preferred. For example, in one or more embodiments, methods described herein may be practiced on a stand-alone gaming device 110 and/or a gaming device 110 in communication only with one or more other gaming devices 110. In such an embodiment, any functions described as performed by the computer or data described as stored on the computer may instead be performed by or stored on one or more gaming devices 110.

Figure 2:
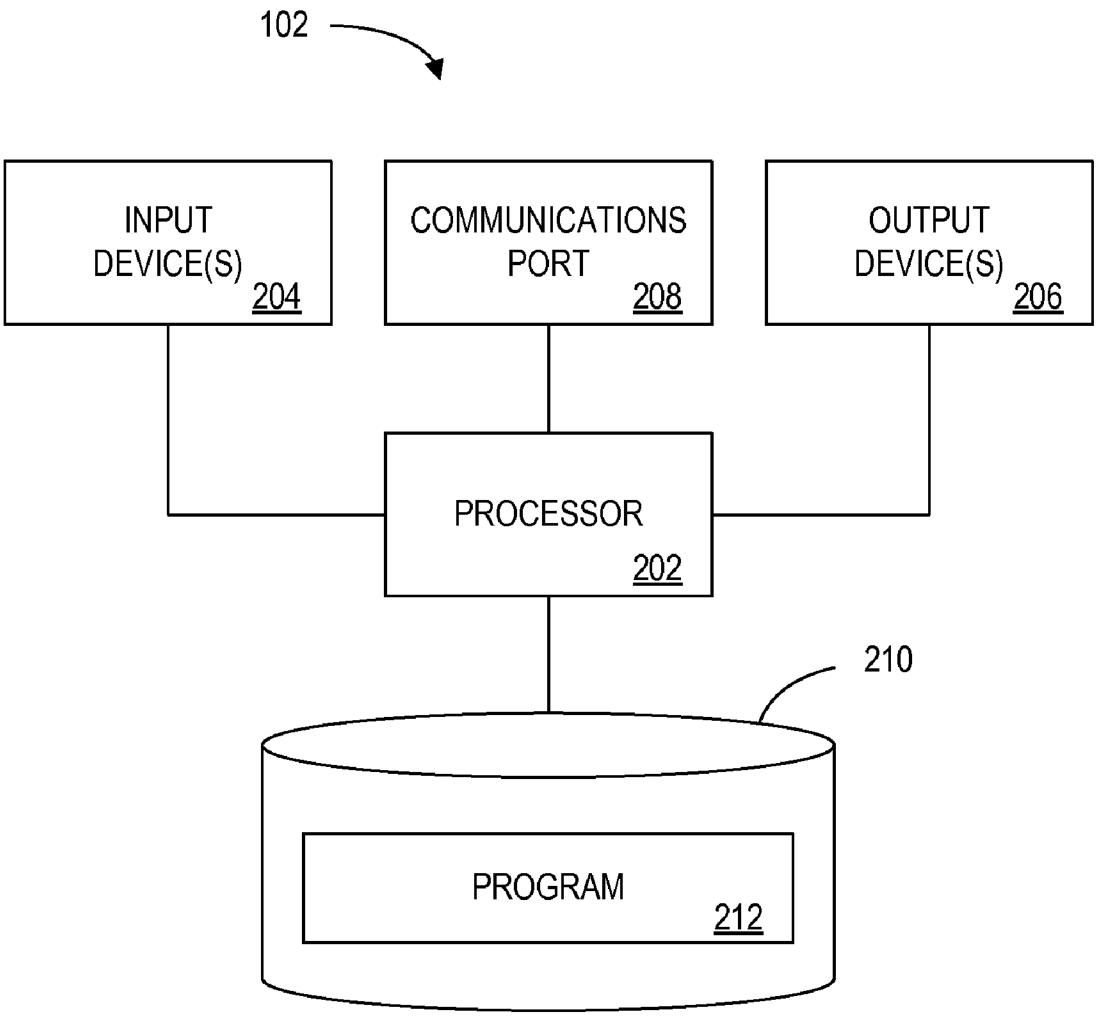
FIG. 2 is a diagram of an exemplary and non-limiting embodiment of a lottery retailer terminal according to the disclosure.

With reference to FIG. 2, there is illustrated a block diagram of an exemplary and non-limiting embodiment of a lottery retailer terminal 102. The lottery retailer terminal 102 may include one or more processor(s) 202 such as the PENTIUM® processor, manufactured by INTEL Corporation, or other processors manufactured by other companies, such as the AMD Athlon® processor manufactured by the Advance Micro Devices company. Generally, the processor 202 is operative to perform or process instructions, and in particular, to operate in accordance with the various methods described herein. For example, the processor 202 may be operable to allow the lottery retailer terminal 102 to transmit data to (and receive data from) the controller 106 of FIG. 1. More specifically, the processor 202 may enable the transmission of data defining or identifying a lottery ticket 500 or entry.

Accordingly, the lottery retailer terminal 102 may further include one or more input device(s) 204. The input devices 204 may include components such as an optical scanner and/or a barcode scanner, for reading and/or for deriving information associated with a lottery entry. For example, a lottery ticket 500 may include registration marks, authenticity data, various codes, micro-printed indicia, one or more sense marks, and/or other lottery indicia that must be read, for example, to distinguish between one or more lottery entries (which may all be contained on one lottery ticket 500, for example). Examples of additional input devices include, but are not limited to, a keypad, a mouse, an image capturing device (e.g., an optical character recognition (OCR) device), a biometric reader, a portable storage device (e.g., a memory stick), and the like.

In accordance with non-limiting embodiments, the lottery retailer terminal input device(s) 204 may comprise or include a clock. The clock may be employed to detect, derive and/or append time and for date information for use by the controller 106 to: (i) create a data record corresponding to lottery tickets 500 or lottery entries purchased at the lottery retailer terminal 102, and/or (ii) create a data record corresponding to a lottery team and/or the association of two or more lottery tickets 500 generated at the lottery retailer terminal 102.

The lottery retailer terminal 102 may further include one or more output device(s) 206. Such output device(s) 206 may include such components as a display for outputting information to a lottery player, a lottery team, or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket 500 or lottery entry, audio/video output device(s), and the like.

The lottery retailer terminal 102 may also include one or more communications port(s) 208, such as a serial port, modem or the like. Generally, the communications port 208 may be operable to facilitate two-way data communications between (i) the lottery retailer terminal 102 and (ii) the controller 106. In accordance with some embodiments, the communications port 208 may operate to facilitate the transmission of information between the lottery retailer terminal 102 and a player device such as a personal digital assistant (PDA), cell phone and/or a dedicated (e.g., a proprietary) device.

The lottery retailer terminal 102 may further include a data storage device 210 such as a hard disk, optical or magnetic media, random access memory (RAM) and/or read-only memory (ROM), or the like memory device. Generally, the lottery retailer terminal data storage device 210 stores a software program, the software program 212 enabling the processor 202 of the retailer terminal 102 to perform various functions including some or all of the various steps described herein. For example, as noted above with respect to FIG. 1, in accordance with some embodiments, the retailer terminal 102 may be configured to perform some or all of the functions of the controller (and vice versa) such that the controller 106 and the lottery retailer terminal 102 may be considered as the same "device". An example lottery retailer terminal 102 available in the marketplace is the EXTREMA® clerk-operated lottery terminal, distributed by Scientific Games Corporation of Alpharetta, Ga.

In some embodiments, a lottery sales device may be utilized in place of a lottery retailer terminal 102. Such a lottery sales device may be implemented as a system controller, a dedicated hardware circuit, an appropriately programmed general-purpose computer, or any other equivalent electronic, mechanical or electro-mechanical device. Thus, in various embodiments, a lottery sales device may comprise, for example, a Video Lottery Terminal that may include a touch sensitive screen for use by a player, a personal computer (e.g., which communicates with a remote lottery server), a telephone, or a portable handheld device (e.g., a device similar to a personal digital assistant (PDA) or other analog or digital communications device). The lottery sales device may comprise any or all of the devices of the aforementioned systems. In some embodiments, a user device such as a PDA, cell phone, and/or portable gaming unit (e.g. the Playstation™ Portable (PSP), distributed by Sony Corporation) may be used in place of, or in addition to, some or all of the device components.

Figure 3:
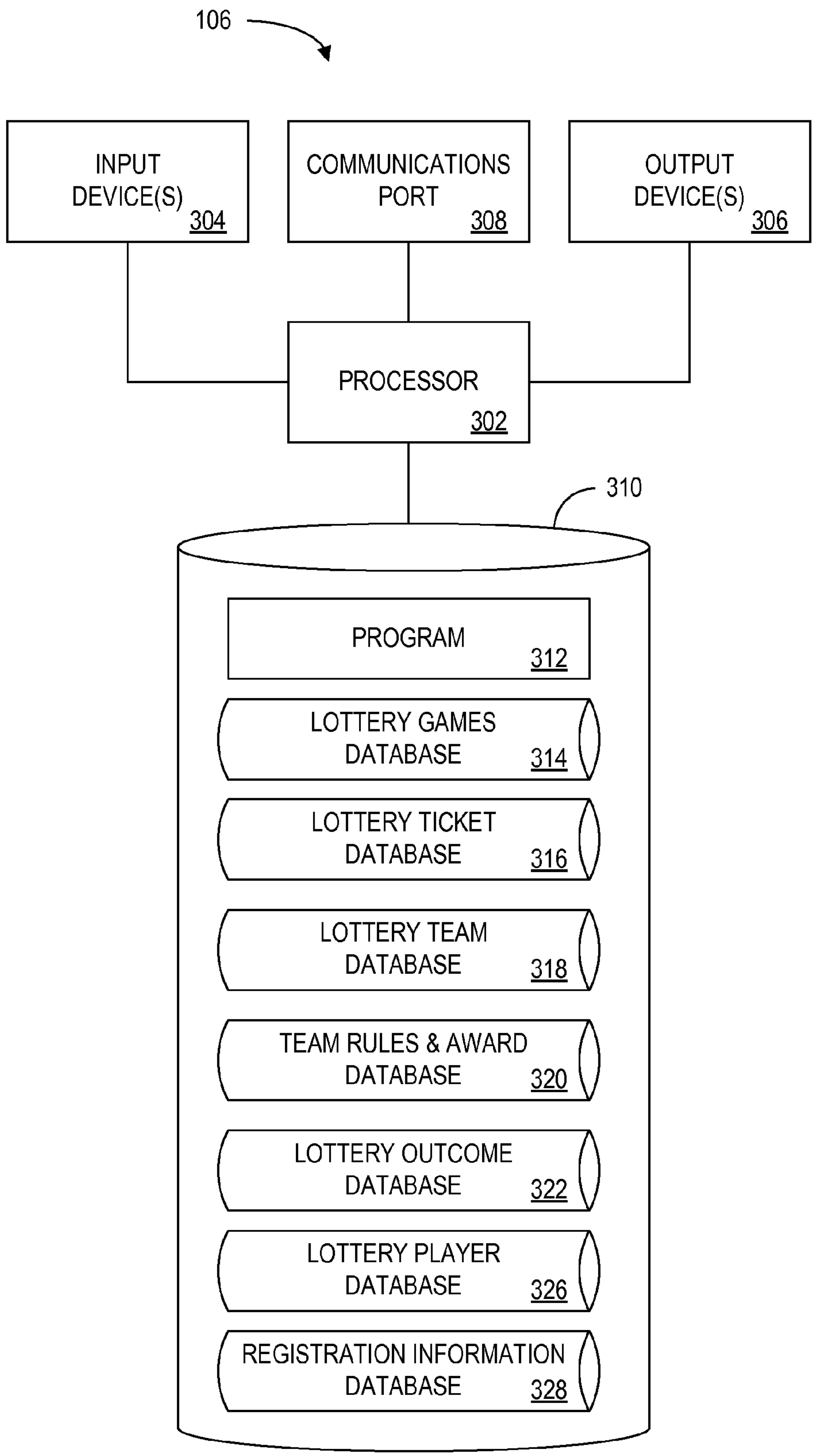
FIG. 3 is a diagram of an exemplary and non-limiting embodiment of a controller according to the disclosure.

With reference to FIG. 3, there is illustrated an exemplary and non-limiting embodiment of a lottery operator controller 106 according to the disclosure. Similar to the lottery retailer terminal 102, the lottery operator controller 106 may include one or more processor(s) 302 such as the PENTIUM® processor manufactured by INTEL Corporation, or the AMD Athlon® processor manufactured by the Advance Micro Devices company. Such a processor 302 functions to process instructions, and in particular, to operate in accordance with various methods described herein. For example, the processor 302 may operate to allow the lottery operator controller 106 to transmit data to (and receive data from) the lottery retailer terminal 102 shown in FIG. 2. More specifically, the controller processor 302 may enable the transmission of data defining or identifying a lottery ticket 500 or entry and/or team, as well as information defining one or more payout(s) associated with that lottery ticket 500, a lottery team, to a lottery team member, or to a specific one of the lottery retailer terminals 102-1 to 102-N. Thus, the lottery operator controller may be implemented as a system controller, a dedicated hardware circuit, an appropriately programmed general-purpose computer, or any other equivalent electronic, mechanical or electro-mechanical device. In various embodiments, a lottery operator controller may comprise, for example, a personal computer (e.g., which communicates with a remote lottery sales terminal) or mainframe computer.

The lottery operator controller 106 may further include one or more input device(s) 304. Examples of such input devices include a keypad, a mouse, a touch-screen, a random number generator, a microphone, and other digital or analog input devices. According to some embodiments, the lottery operator controller input device(s) 304 may comprise or include a clock. As described above, the clock may be employed to derive time and/or date information for use by the lottery controller 300 to (i) generate a data record corresponding to lottery tickets 500 or lottery entries purchased at the lottery retailer terminal 102, and/or (ii) create a data record corresponding to a lottery team and/or the association of two or more lottery tickets 500 generated at the lottery retailer terminal 102.

Exemplary embodiments of the lottery operator controller 106 further include one or more output device(s) 306. Example of output devices 306 include a monitor or other display for outputting information to a user of the lottery operator controller 106 (e.g., for displaying information such as statistical or sales data, win and loss information, team and/or associated ticket information, and/or payout amounts), a printer for producing a physical record (e.g., a report, a paper slip, a voucher, a coupon, a ticket) of such data, and the like. In addition, the lottery operator controller 106 may include one or more communications ports 308, such as a serial port, modem or the like, operable to facilitate two-way data communications between (i) the operator controller 106 and (ii) one or more lottery retailer terminals 102.

The lottery operator controller 106 may also include a data storage device 310 (e.g., a hard disk or hard drive, a media-based (removable) memory, or the like). In some embodiments, the lottery operator controller data storage device 310 stores at least one software program 312, which includes a program to enable the processor 302 to perform some or all of the various steps and functions of at least one implementation of the methods described in detail herein. In addition, the lottery operator controller data storage device 310 may operate to store (i) a lottery games database 314, (ii) a lottery ticket database 316, (iii) a lottery team database 318, (iv) a team rules & awards database 320, (v) a team outcome database 322, (vi) a lottery player database 326, and/or (vii) a registration information database 328.

In some embodiments, the lottery operator controller 106 may include a lottery ticket server device that is located at a lottery ticket printing facility, and may also function to manage the ticket printing process. The lottery operator controller 106 may also function to develop a lottery game matrix (e.g., determining base payouts, team award payouts, win frequencies and the like) and to match static lottery content with secure paytable (or payout distribution) data. In some embodiments, a lottery ticket printer device for use in such lottery systems may utilize the game matrix information from the lottery server and may apply it to the secure paytable data.

In accordance with exemplary and non-limiting embodiments, a kiosk (not shown) may be configured to execute or assist in the execution of various lottery game processes. In an exemplary embodiment, a kiosk may comprise a processor and a storage device or memory as described above. A kiosk may also comprise various input devices (e.g., a keyboard, a mouse, buttons, an optical scanner for reading barcodes or other indicia, a CCD camera, and the like), output devices (e.g., a display screen, audio speakers, printer), benefit output devices (e.g., a coin tray, a currency dispenser), communications ports, and the like. A kiosk may be configured to communicate with a lottery controller or lottery server. In some embodiments, kiosks may execute or assist in the execution of various lottery functions, as described herein.

In some embodiments, players may use one or more computing devices to obtain more information about the lottery games, lottery teams, associated lottery tickets with MMLO, and/or the specific lottery game that the player is playing. For example, a player may utilize a personal computer to access a website that contains lottery game hints, lottery game instructions, winning lottery entry payout information that includes base payout information and team payout information, and the like.

As illustrated, data storage device 310 may comprise one or more databases including, but not limited to, (i) lottery games database 314, (ii) lottery ticket database 316, (iii) lottery team database 318, (iv) team rules & award database 320, and (v) lottery outcome database 322.

With reference to FIG. 4, there is illustrated a tabular representation of an exemplary embodiment of the lottery operator controller lottery games database 314. The lottery games database 314 stores data associated with one or more lottery games and/or lottery game formats. It should be understood that the various database examples described herein include illustrative accompanying data as shown in the drawings. Consequently, the data appearing in the databases is exemplary in nature, and such data entries are not limiting with regard to functionality or to the types of data that may be stored therein.

With continued reference to FIG. 4, each record in the lottery games database 314 generally defines a game available for play and/or for purchase of lottery entries by a lottery player. In particular, for each game defined by an entry in the lottery games database 314, a game identifier field 402 stores data that uniquely identifies the lottery game of the corresponding record. The data stored in the game identifier field 402 may comprise, for each available game, a unique numeric, alphanumeric or other type of code that uniquely identifies the lottery game defined by the corresponding entry.

For each lottery game identified by an entry in the game identifier field 402, one or more associated game rules field(s) 406 may store data or information, including a textual description of the criteria required of a lottery entry to be successful (i.e., to win a prize) in the corresponding lottery game. For example, referring to row R400-1, the game identified as "GM-DRAW-001" in the game identifier field 402 corresponds to lottery game rules based on a standard "Pick 6" on-line lottery game, wherein a player selects six numbers and winning lottery entries match at least 3 of 6 drawn numbers. The lottery games database 314 also includes a Payout Criteria 1 field 408, Payout 1 field 410, Payout Criteria N field 412 and a Payout N field 414. For any particular "Pick-6" lottery game, more or less payout criteria and payout fields would be included, which will be explained in more detail below.

For example, the Connecticut Lottery Corporation provides a "Pick-6" on-line lottery game called "Classic Lotto" wherein players go to a lottery retailer and fill out a "Classic Lotto Play Slip" by choosing six different numbers from the ordinal range of 1 to 44 (inclusive) in each individual play section or board (alternately, a computer can randomly pick the numbers for the player, if the player so chooses). Players of "Classic Lotto" can play up to five boards on each selection slip, and pay one-dollar per entry. For example, a lottery player can pay a clerk at a lottery retailer five dollars to purchase five lottery entries, wherein each lottery entry includes six numbers selected from the 44 available choices. Thus, the player may fill in a pay slip and hand it to the clerk, who then enters the pay slip into the retailer terminal. The lottery terminal then issues a printed "Classic Lotto" ticket for the player to take home. The player keeps the ticket until the drawing for that lottery game, and then compares the number of his lottery entries to the drawn numbers to determine if he has won any prize(s).

With continued reference to FIG. 4, row R400-1 illustrates a Pick-6 lottery game identified as "GM-DRAW-001", and the payout criteria field 408 indicates that if the player matches 3 out of 6 drawn numbers, then a payout of three (3) dollars is made (see Payout Field 410). Larger payouts would also be determined for matching 4 out of 6 and for matching 5 out of 6 numbers as well (which payout criteria is not shown). The Payout Criteria N field 412 indicates that a win of 6 out of 6 matches pays out the top prize, and the top prize is yet to be determined as shown in Payout N field 414 (because the top prize is typically calculated by the lottery authority as a percentage of the total amount of money spent by players to purchase tickets, and the calculation may also include other variables that would serve to either increase or decrease the top prize value).

For each game corresponding to an entry in the game identifier field 402, one or more payout criteria fields (408 and 412) and a corresponding payout field (410 and 414) store data specifying the actual criteria and corresponding payouts for lottery tickets that satisfy such criteria. For example, using the "Pick-6" example above, the following table illustrates typical payout criteria and corresponding payouts:

| Criteria | Payout |
|---|---|
| Match 0/6 | 0 |
| Match 1/6 | 0 |
| Match 2/6 | 0 |
| Match 3/6 | $3 |
| Match 4/6 | $50 |
| Match 5/6 | $2,000 |
| Match 6/6 | Win Jackpot/Top Prize |

Lottery games database 314 also includes data for other lottery games. In particular, row R400-2 for lottery game GM-DRAW-002 is a "Pick-3" type of game, and the data includes a game rule 406 wherein a player must match the three drawn numbers in exact order. The payout criteria 408 for matching one number out of the three drawn in the correct order corresponds to a nominal-level payout value of three-dollars as shown in the Payout 1 field 410. In addition, a payout criteria for matching two out of three numbers (not shown) is stored, and payout criteria N (which is the third criteria in this example) recites that if the player matches all three numbers in order, then that lottery ticket 500 corresponds to a high-level base payout 414 of five hundred dollars.

Referring to row R400-3, the lottery game GM-DRAW-003 corresponds to a "Pick-4" type of game, and includes a game rule 406 wherein a player may match up to four drawn numbers in any order. The Payout Criteria 1 in field 408 for matching two numbers out of the four drawn corresponds to a nominal-level payout value of five-dollars as shown in Payout 1 field 410. In addition, Payout Criteria N (which is the fourth criteria for this example) recites that if the player matches all four numbers (in exact order) then a high-level payout 414 of five thousand dollars is made. As explained earlier, the database 400 also includes entries for matching three out of the four numbers (with associated payout amounts) as well.

Row R400-(N−1) corresponds to lottery game GM-DRAW-N, which is a "Pick-10" type of game that includes a game rule 406 specifying that a player may select up to 10 numbers from a field or board of 80 numbers. If a player only picks one spot (i.e., only picks one number) as specified in the Payout 1 field 408, and that spot matches a drawn number then the player wins a nominal-level two-dollar prize as shown in the Payout 1 field 410. However, if the player picks ten spots and all ten match the drawn numbers as specified in Payout Criteria N field 412, then as shown in Payout N field 414 he is entitled to a high-level, one-hundred thousand dollar prize. As explained above, database entries would also exist to include all intermediate winning combinations, for example, payout amounts for obtaining three out of three matches numbers, four out of four matches, four out of five matches, five out of five matches (and possibly prizes for matching most numbers of a group, such as obtaining five out of six matches, six out of seven matches, and the like), and any other matching sets or match permutations as desired.

Lastly, row R400-N illustrates data for lottery game GM-INSTANT-N, which corresponds to an instant lottery game. This lottery game includes a game rule 406 specifying that a player scratches off the play area to reveal symbols, and if any three of such symbols match, then the prize payout corresponds to the symbols that match. In this case, the game rules are equivalent to the payout criteria. For example, if the player scratches off three matching symbols that each indicate "Two Dollars", then a nominal level prize payout of two-dollars is awarded as indicated in the Payout 1 field 410. If the player matches three symbols that each indicates "$1,000.00", then as shown in Payout N field 414 the player is entitled to that high-level amount as a prize.

With continued reference to FIG. 3, the lottery ticket database 316 stores data associated with lottery tickets 500 and/or sets of lottery tickets. It should be understood that the various database examples described herein include illustrative accompanying data. Consequently, the data appearing in the databases is exemplary in nature, and such data entries are not limiting with regard to functionality or to the types of data that may be stored therein.

In accordance with exemplary embodiments, the lottery ticket database 316 may include information, such as lottery ticket identifiers (e.g., "14958085123"), lottery ticket numbers or entries (e.g., selected by the player, machine generated numbers, such as 23-05-15-09-21-34), a team identifier, if applicable (e.g., "Team #132940815, "Bob's Bruisers", or "N/A" for a ticket that is not part of a team), an identifier for a set of tickets we (e.g., pre-packaged booklet of lottery tickets), a terminal number (i.e., where the ticket was sold), a drawing date (i.e., which drawing(s) will be used to determine if the ticket is a winner), and/or an indication of whether the ticket is eligible for team play. For example, a player may be required to pay an additional fee when purchasing a ticket in order to qualify for team play or a player may be required to register with a lottery website and receive a player identifier in order to qualify for team play.

The lottery team database 318 stores data associated with lottery teams and/or associated lottery tickets 500. It should be understood that the various database examples described herein include illustrative accompanying data. Consequently, the data appearing in the databases is exemplary in nature, and such data entries are not limiting with regard to functionality or to the types of data that may be stored therein.

In accordance with exemplary embodiments, the lottery team database 318 may include information, such as team identifiers, ticket identifiers, minimum/maximum # of lottery tickets allowed per team, player name(s), and/or a date team was created/registered. Note that in some cases, players may not register a name, but only associate lottery tickets with a team. In such circumstances, "not applicable" or "N/A", "not available", or similar values may be entered within the database field.

The team rules & awards database 320 stores data associated with the various rules required for a team to win in a secondary game, wherein the rules are mainly based on lottery ticket symbols from the team's lottery tickets, and the corresponding payouts and/or prizes. It should be understood that the various database examples described herein include illustrative accompanying data. Consequently, the data appearing in the databases is exemplary in nature, and such data entries are not limiting with regard to functionality or to the types of data that may be stored therein.

In accordance with exemplary embodiments, the team rules and awards database 320 may include information, such as a number of tickets within a team and ticket identifiers. In some embodiments, the ticket identifiers refer to lottery entries in the lottery ticket database 316 as described above. Team rules and awards database 320 may additionally include information such as conditions/rules for a team win (e.g., position considerations, order count), a number of possible combinations, the odds of winning based on considerations (e.g., other database fields, such as column 1, 2, etc.), an indication of prize amount, and/or a percentage of shares among ticket holders.

The team outcome database 322 stores data associated with team outcomes (e.g., matching outcomes, aggregated ticket information from tickets associated with the team or one another). It should be understood that the various database examples described herein include illustrative accompanying data. Consequently, the data appearing in the databases is exemplary in nature, and such data entries are not limiting with regard to functionality or to the types of data that may be stored therein.

In some exemplary and non-limiting embodiments, the team outcome database 322 may include information, such as an outcome identifier and aggregated matching lottery ticket numbers for team. In accordance with some embodiments, the system 100 highlights or simply includes the matching team lottery numbers/entries as compared to a lottery drawing outcome. The team outcome database 322 may additionally include information, such as the total # of matching numbers, an outcome award (if any), a team identifier, and/or a ranking of players. In some embodiments, the ranking of players is based on the amount of contributing factors for the team win (e.g., a player with the most matching numbers may be rated/ranked higher, a team player with no matching numbers may be ranked last).

Figure 5:
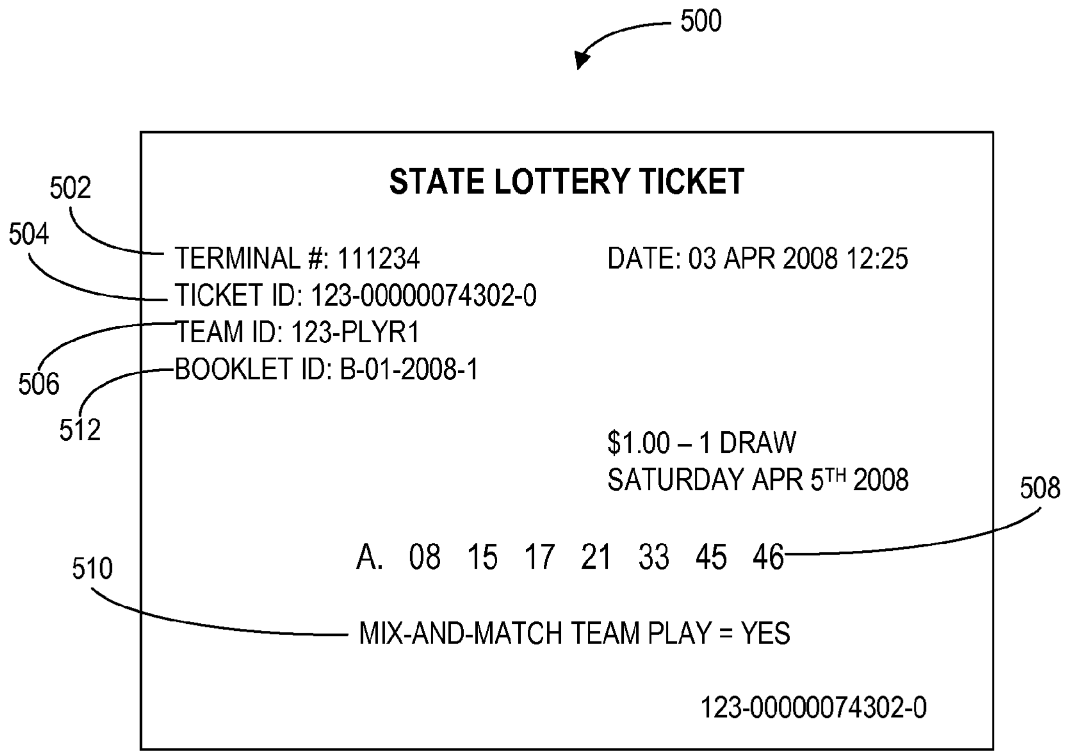
FIG. 5 is a diagram of an exemplary and non-limiting

With reference to FIG. 5 there is illustrated an exemplary lottery ticket 500 with MMLO. As illustrated, lottery ticket 500 comprises a terminal id 502, a ticket id 504, a team id 506, a booklet id 512, lottery number selections 508, and MMLO indicator 510.

Lottery tickets 500 may be sold at various retailers, as known to those skilled in the art, including, but not limited to, grocery stores, corner stores, websites/online retailers, kiosks/lottery terminals, mobile devices/cell phones and the like. Selling a lottery ticket 500 may involve using a Lottery Communications Network 104, Lottery Retailer Terminal 102, a gaming device 110, and/or a Lottery Operator Controller 106.

Similarly, a lottery ticket 500 with a MMLO may be sold at any of these locations. Alternatively, a MMLO may be activated after a lottery ticket 500 has been sold.

Figure 6:
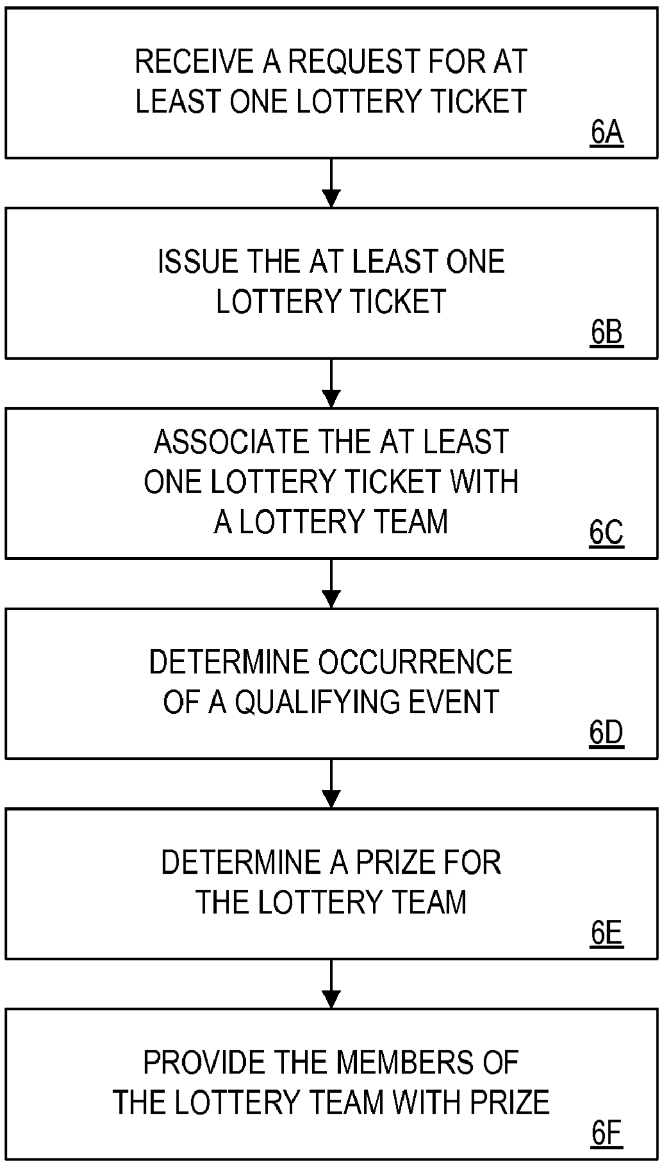
FIG. 6 is a flowchart of an exemplary and non-limiting embodiment of a method according to the disclosure.

With reference to FIG. 6, there is illustrated a flow chart of a method according to exemplary and non-limiting embodiments disclosed herein. At step 6A, a request is received from at least one player for at least one lottery ticket 500 having, or to which will be applied, an MMLO. At step 6B, the lottery ticket 500 is issued. At step 6C, each of the issued lottery tickets 500 is associated with a lottery team. At step 6D, a determination is performed to see if a qualifying winning event has occurred with respect to the lottery tickets 500 associated with the lottery team. At step 6E, a prize is determined for the lottery team. Lastly, at step 6F, members of the lottery team are provided with a prize. Each of steps is 6A-6F is described more fully below as follows.

With reference to step 6A, a request is received from at least one player for at least one lottery ticket 500 having, or to which will be applied, an MMLO. In exemplary and non-limiting embodiments, the request may include a payment for the lottery ticket 500. In an exemplary embodiment, the player may pay a regular price for the lottery ticket 500. For example, a player may only pay for the ticket 500 at time of purchase, but still has the option to add the MMLO at a later time. In such an instance, the player pays a fee for the MMLO at the time when the ticket 500 is added to a team or a group. In accordance with another exemplary embodiment, the payment for the lottery ticket 500 may include an additional amount for the MMLO. For example, a player may pay an additional $0.50 per ticket to enable the MMLO on a set of 3 tickets; resulting in an additional payment of $1.50. In accordance with another exemplary embodiment, the player may not have to pay an additional amount for the MMLO. For example, the MMLO fee may be waived when the player purchases 3 sets of lottery tickets (e.g., 3 booklets of 5 lottery tickets with MMLO). Various methods of payment may be received. Method of payment may include, but are not limited to: cash, credit card, debit card, a financial account, a bank account, a gift card, and/or a traveler's check.

In accordance with other non-limiting embodiments, the request to obtain a lottery ticket 500 may include an indication to purchase a lottery ticket. In accordance with non-limiting embodiments, the lottery ticket 500 may not have MMLO. The MMLO may be later added to the single lottery ticket. For example, the MMLO may be activated (i.e., associated with other tickets for team play) on a ticket 500 via a Web site. The ticket 500 may then be eligible to create and/or join a group, which allows two or more tickets to participate in a secondary game using a combination of symbols from the team's tickets 500. In other non-limiting embodiments, the lottery ticket may include the MMLO. In some cases, the lottery ticket with the MMLO may need to be added to a lottery team or group and may not be eligible for secondary game participation until then.

In accordance with other exemplary embodiments, a set of lottery tickets 500 with MMLO (e.g., pack of 5, a booklet of 10) may be requested. In some embodiments the set of lottery tickets 500 may already be activated and associated with one another, thus a group may already have been created and stored.

In another embodiment, the set of tickets may be printed as individual tickets from, for example, a lottery retailer terminal 102 and given to the player. For example, a player may request "X" amount of lottery tickets with MMLO. For example, a player may say "I'd like a 3 pack of lottery tickets with Mix-and-Match play". In such an instance, there would be created team play at point-of-sale. The ticket 500 may offer team identifiers 506 (e.g., team name, an alphanumeric code) and/or an indication the MMLO is activated, such as MMLO indicator 510. This embodiment is particularly applicable to the situation when a single player wants to group his own tickets 500 into a "team", since the player may prefer to buy all the tickets at the same time with the MMLO already enabled.

In another non-limiting embodiment, a request for a lottery ticket 500 may be received in various manners. According to some embodiments, the request may be received through via a lottery agent. For example, a player may verbally ask a store cashier for a ticket at a terminal; "I'd like 2 lottery tickets with Mix-and-Match team play". In one embodiment, a request for MMLO to be added to a lottery ticket may be in response to an up-sell pitch provided by a lottery agent. For example, a player may request two lottery tickets for tonight's drawing to an agent. In response, the agent asks the player if they would like to add MMLO to the ticket for an additional dollar and the player agrees.

According to other non-limiting embodiments, the request for a lottery ticket 500 may be received via a Lottery Ticket Printing Facility. For example, a manufacturer may request lottery ticket information for the production of pre-packaged lottery tickets. As discussed above, a lottery ticket printing facility may include a lottery ticket server device that is communication with a lottery operator controller 106, which may manage the ticket printing process.

According to other non-limiting embodiments, the request for a lottery ticket 500 may be received via lottery play slip. For example, a player may complete a Lottery Play Slip offering various information, such as (i) lottery entries or numbers for each ticket 500, (ii) a checkbox for MMLO, (iii) a check box to associate tickets 500 with one another (i.e., create a team or team play), (iv) a checkbox to indicate individual tickets 500, and (v) other information associated with lottery play and/or embodiments disclosed herein.

According to other non-limiting embodiments, the request for a lottery ticket 500 may be received via a lottery terminal, a lottery kiosk, or the Internet. For example, a player may request a virtual lottery ticket through a state lottery Web site. More generally, a request for a lottery ticket 500 may be received through the use of an input device. For example, a player may purchase tickets by pressing a button on a lottery ticket dispensing device (e.g., terminal, a kiosk, a cell phone).

With reference to step 6B, once a request for at least one lottery ticket 500 with a MMLO has been received, a lottery ticket 500 is issued. An issued "lottery ticket" or "ticket" may refer to any type of ticket, including an electronic representation of a ticket, used in any type of lottery game offered by a lottery game provider. Lottery games include any number of variations and combinations. Exemplary and non-limiting embodiments of this disclosure can be applied to any type of lottery games.

A lottery ticket 500 may be issued as one or more cards which are made of paper, cardboard, plastic, or any other suitable material and include identification and game playing information printed thereon. Alternatively, lottery tickets 500 may be represented magnetically, optically, or electronically. For example, lottery tickets 500 may be represented as electronic characters or images in a memory or on a video monitor that are generated and stored on a computer or other portable information device. Furthermore, electronic lottery tickets 500 may be used in a lottery game conducted over a computer network such as the Internet. Further, tickets 500 may be embodied as magnetic stripes on cards, patterns on magneto-optical media, and/or bit patterns in a smart card or electronic, magnetic, or optical circuit.

Examples of lottery tickets 500 include printed tickets. For example, a lottery ticket 500 may be printed directly from a lottery terminal or a ticket printing facility. In other embodiments, the lottery ticket 500 may be an electronically generated ticket such as, for example, a ticket 500 purchased from a state lottery Web site that is emailed to a player and/or team players. In other embodiments, the lottery ticket 500 may be an electronically displayed ticket. For example, a ticket 500 may be accessible through a user account associated with the state lottery Web site. In yet other embodiments, the lottery ticket 500 may be a scratch-off ticket. For example, a manufacturer may offer prepackaged scratch off tickets (e.g., 3 individual tickets) with MMLO.

In one embodiment, a lottery ticket 500 may contain various information associated with lottery game and/or embodiments discussed in the current disclosure (e.g., items associated with MMLO). Additionally, an issued ticket 500 may include information relating to team rules and/or awards.

In exemplary embodiments, a lottery ticket with MMLO is issued to a player. According to some embodiments, the lottery tickets 500 may be issued via a lottery retailer terminal 102. As discussed above, the lottery retailer terminal 102 may include one or more output devices. For the purposes of issuing a lottery ticket 500 with MMLO, these output devices may include such components as a display for outputting information to a lottery player, a lottery team, or to a terminal operator (e.g., ticket information), a printer for producing a physical record (e.g., paper slip, receipt, ticket, voucher, coupon, etc.) that defines a lottery ticket or lottery entry, audio/video output device(s), and the like.

According to other non-limiting embodiments, the lottery tickets 500 may be issued via a lottery kiosk or a lottery operator controller 106. As discussed above, the controller 106 may include one or more output devices. For the purposes of issuing a lottery ticket 500 with MMLO, these output devices may include a monitor or other display for outputting information to a user of the lottery operator controller 106 (e.g., for displaying information team and/or associated ticket information, and/or payout amounts), a printer for producing a physical record (e.g., a report, a paper slip, a voucher, a coupon, a ticket) of such data, and the like.

According to other non-limiting embodiments, the lottery tickets 500 may be issued via a lottery agent. For example, a lottery agent may generate one or more lottery tickets 500 from a lottery terminal and offer to the player upon payment. In another example, an agent may have stock of pre-packaged tickets. Upon request, the agent may scan a barcode associated with the prepackaged tickets to register the cost of the goods and remove from inventory (i.e., inventory tracked electronically). In some cases, the prepackaged tickets may not be activated until the packaged is scanned and paid in full.

According to other non-limiting embodiments, the lottery tickets 500 may be issued via the internet. For example, an electronic representation or virtual ticket 500 may be distributed via the Internet. In one example, the electronic version of the ticket 500 is issued from a state lottery Web site.

In one non-limiting embodiment, team and/or team play information, player information, as well as data associated with tickets 500 with MMLO may be stored for later use. Stored information may be accessed via a Web site (e.g., state lottery), so one or more players may easily track team activity. According to some embodiments team and/or team play information, player information as well as data associated with tickets with MMLO may be stored on a computer system accessible by the lottery, player, and/or invited guests (i.e., guests who may have been invited to consider joining a given team). For example, information may be stored within an appropriate database that may be managed by a state lottery, state lottery affiliate, or a third-party data management service. For example, ticket information may be stored within a lottery ticket database 316. In another example, team information may be stored within a lottery team database 318.

In one embodiment, an indication of one or more players' acceptance or registration for a team play may be transmitted to a computer server or controller 106. According to some embodiments a computer server/controller 106 may store this information in a database (e.g., lottery team database 318) A controller 106 may use this information to aggregate data to determine team outcomes. A controller 106 may divide team prize shares at the end of lottery play (e.g., communicating with team ticket holders to disclose outcomes).

In accordance with exemplary and non-limiting embodiments, a player may purchase a lottery ticket 500 as during a first transaction and then add MMLO to the lottery ticket 500 such as via a section transaction. For example, a player may pay for lottery ticket 500 at the time of purchase and decline to purchase a MMLO at that time. However, in some embodiments, the player may still add the MMLO to his or her ticket at a later time. For example, the player may wish to create a team or group and invite his or her friends to participate. Similarly, the player may receive an invitation to participate in a co-worker's, a friend's, and/or a family member's team.

Adding a MMLO to a lottery ticket 500 may occur in a second transaction at the same retailer where the lottery ticket was initially sold, or via a transaction at a different lottery retailer. Also, the party that activates the MMLO may be a different party than the one to whom the ticket 500 was originally sold (e.g., if the ticket was given as a gift). For example, a player purchases lottery ticket at supermarket. Subsequently, the player adds the MMLO to the ticket 500 via a website. In another example, a player purchases lottery ticket 500 at a supermarket. Then player then adds MMLO option to the ticket 500 by using a kiosk at the supermarket. In yet another example, a player purchases lottery ticket 500 at supermarket on Tuesday. On Wednesday, the player returns to the supermarket and activates the MMLO option via a second transaction. In another example, a player purchases lottery ticket 500 via a website, with local pickup at a supermarket. When picking up the ticket 500 at the supermarket, the player activates the MMLO option. In yet another example, Alice purchases lottery ticket 500 at supermarket. Alice gives the ticket 500 to her friend Bob on his 30th birthday. Bob then visits a corner store to add an MMLO to the lottery ticket 500.

In exemplary embodiments, the transaction to add a MMLO to a lottery ticket 500 already in a player's possession may include the following steps. First, lottery ticket in the player's possession is identified (e.g., a lottery ticket that the player previously purchased, or a lottery ticket 500 that was given to the player as part of a promotion). This may be done using a lottery ticket identifier 504 printed on the ticket 500 or stored in a file associated with an electronic lottery entry. Next, the identity of the player may be verified to prevent unauthorized resale or transfer of lottery tickets (e.g., to minors). A verification may be performed to ensure that the player in possession of the ticket 500 meets a requirement for gaming (e.g., at least 18 years old). Alternatively, this step may not be necessary if a player's identity was confirmed in a previous transaction. Next, a payment from the player is received. The payment may comprise cash, credit, and/or other forms of consideration. Lastly, MMLO option for the ticket is activated. The activation may include updating the Lottery Ticket Database 316 to show that the MMLO option is now activated for the ticket 500.

As discussed above, the player may pay a fee for the MMLO at the time when the ticket 500 is added to a team or a group. In an exemplary embodiment, a player may visit a lottery website and pay an extra $1 to activate Mix-and-Match option on his lottery ticket 500. In most cases, the age of the ticket owner has already been verified at original point-of-sale and may be re-verified by the state lottery Web site again, if desired (e.g., via credit card, driver's license, etc). In some non-limiting embodiments, the MMLO may be available for free to players who visit the lottery website and registers for Preferred Player Club.

With reference to step 6C, each of the issued lottery tickets 500 is associated with a lottery team. In accordance with exemplary and non-limiting embodiments, the process of associating each issued lottery ticket 500 with a lottery team comprises the steps of receiving a request to create a lottery team, receiving one or more requests from players to join a lottery team associated with a MMLO, and, lastly, associating each of the lottery tickets 500 of each player belonging to the lottery team with each other lottery ticket 500 of each player belonging to the lottery team.

A lottery team allows its ticket holders to participate in a secondary game with other team members by combining symbols from each of their tickets (e.g., three Pick-6 lottery entries). A group may consist of one or more associated lottery tickets with MMLO, however, at least two tickets are required for participation in the secondary game (i.e., combining symbols from each of the team's tickets in an effort to win additional prizes). Also, a group may consist of one or more players or ticket holders.

The step of creating a Mix-and-Match Lottery Team may be performed before, during, or after the step of Selling Mix-and-Match Lottery Tickets. In a first example, a lottery ticket printing facility may produce lottery ticket booklets with MMLO requiring the facility to create a team as well as associate the team tickets 500 with one another prior to making the tickets 500 available for purchase. In a second example, a lottery agent may create a lottery team while selling a ticket 500 to a player at point-of-sale. For example, an agent may enter into a terminal a player's request for two lottery tickets 500 with Mix-and-Match team play, which would create a team as well as associate the team tickets with one another during the purchase process. In a third example, a ticket holder may create a lottery team through a state lottery Web site after buying a lottery ticket 500 (note a lottery ticket 500 may or may not already have MMLO; a player may add on the MMLO as they create a team). For example, a ticket holder may visit www.XYZstatelottery.com and create a Mix-and-Match Lottery Team and invite his or her friends to participate.

In accordance with exemplary embodiments disclosed herein, a request to create a lottery team may be received in various manners. According to some embodiments, the request may be received via a lottery agent. For example, a player may verbally ask a store cashier to create a lottery team for Mix-and-Match; "I'd like to create my own Mix-and-Match lottery team" and then offer specific details. In one non-limiting embodiment, the player may then purchase lottery tickets 500 and add them to the team. According to other embodiments, the request may be received via a lottery ticket printing facility. For example, a manufacturer may request a lottery team identifier for the production of pre-packaged lottery tickets 500. A lottery ticket printing facility may include a lottery team server device that is communication with a lottery operator controller 106, which may manage the ticket printing process. In some embodiments, the request will come from a production floor responsible for creating sets of lottery tickets (e.g., booklets, bundled lottery tickets).

According to other non-limiting embodiments, the request may be received via a lottery play slip. For example, a player may complete a lottery play slip offering various information, such as a check box to associate tickets with one another (i.e., create a team or team play). According to other embodiments, the request may be received via a lottery retail terminal 102. According to other non-limiting embodiments, the request may be received via a lottery kiosk. According to other non-limiting embodiments, the request may be received via the internet. For example, a player may request to create a lottery team through a state lottery Web site. More generally, a request may be received through the use of an input device. For example, a player may create a team by pressing a button on a lottery device (e.g., terminal, a kiosk, a cell phone).

A lottery team may be created by various methods. According to some embodiments a lottery team may be created upon request from a player, a lottery, and/or a third-party affiliate. For example, a player may visit a state lottery Web site and create a team, wherein a team identifier is established and associated with the player. The player may add lottery ticket identifiers 504 at his or her convenience. A lottery team may be created by associating two or more lottery tickets together. Once the association between the two or more lottery tickets is complete, then a team identifier 506 may be established. A team may be created upon generating a lottery ticket 500 with MMLO. A team may be created upon receiving a lottery ticket identifier 504 enabled with MMLO.

In one embodiment, the player creating the group may determine parameters for team play, such as a minimum and maximum number of tickets with MMLO allowed within the team, types of awards, etc.

In accordance with one exemplary embodiment, a player may receive an invitation (e.g., a printed ticket 500 from a lottery terminal with information on how to join a team, an email, etc) to join a lottery team. Such an invitation may be received from his or her family, friends, co-workers, acquaintances, other players, state lottery, local retailer, etc.

In another exemplary embodiment, a player may visit a Web site (e.g., a state lottery Web site) to search for team to join. The Web site may provide a search tool offering various search criteria. For example, a player may want to find a local team to join for Friday night's drawing or a drawing that offers a certain payout. In some embodiments, the player may send a request to join a team before being added to the team. In one embodiment, a player may post his or her desire to join (or create) a team and offer specific details that he or she is looking for. In some cases, the player posting the bulletin may leave contact information as well.

In one embodiment, a player may be allowed to join a lottery team. According to some embodiments the lottery player may receive acceptance to join a team (e.g., the player may receive an email or otherwise be contacted). The indication of acceptance may be sent from a player, a lottery, and/or a third-party affiliate. In accordance with some non-limiting embodiments, a player may be required to pay to join the team and/or pay a fee for the MMLO (if MMLO is not a feature on the ticket 500). In one embodiment, a price associated with joining a team and/or paying a fee for the MMLO may be based on a number of other team players, a number of ticket identifiers, and/or a payout prize. Upon joining a team, details of the team and/or team play may be sent to the player. The player may be required to enter and/or offer one or more lottery ticket identifiers 504 in order to join a team. After the ticket identifiers are entered in the system for joining a team, the entered ticket identifiers may be associated with other team tickets.

There may be restrictions relating to which lottery tickets may be joined in a team. For example, if a first lottery ticket includes a pick of a number (e.g., 31) and a second lottery ticket includes a pick of the same number (e.g., 31 again), then it may not be permissible to join two lottery tickets into a team, since this could affect the odds of lottery team winning a prize.

To ensure that the lottery is fair to players who wish to form a team with overlapping numbers, various remedies may be considered by the lottery operator, such as, when forming a team, players may be informed if the numbers on their lottery tickets overlap. This may enable the players to join different tickets in the team, or change their tickets so that the numbers do not overlap. In addition, when forming a team, players may be prevented from joining tickets that have overlapping numbers. In other embodiments, a benefit (e.g., increased prize values, discounted entry fees) may be provided to players on a team that has lottery tickets with overlapping numbers. In other embodiments, a team may be required to have at most a threshold number of overlapping numbers. In yet other embodiments, a team may be required to have at least a threshold number of overlapping numbers.

In accordance with exemplary and non-limiting embodiments, as ticket identifiers 504 are added to a lottery team, an association is created between the team's tickets. A "ticket association number" or a "team identifier" 506 may allow the controller to determine which tickets to review and thus, which symbols to consider for determining a team outcome. The Lottery Team Database 318 may be updated to include an indication of a new team, or to add a ticket 500 to an existing team.

In some embodiments, pre-packaged lottery tickets 500 with MMLO may already be associated with one another. Likewise, single ticket purchases with MMLO may be associated with one another at the point of purchase.

When associating lottery tickets to form a team, one or more players on the team may specify the manner in which the lottery tickets 500 should be considered when determining if the team is a winner. For example, the players may specify the order of the tickets 500 in the team (e.g., Alice's ticket is first, followed by Carly's ticket, followed by Bob's ticket). This embodiment may be particularly applicable when the order of the tickets matters in the method of comparison. For example, a team may win a prize if their lottery tickets match one or more winning lottery numbers in the order that the winning lottery numbers are revealed. In another example, the players may specify which numbers or symbols on each ticket are relevant to the team (e.g., only 3 symbols from each ticket may be part of the comparison to determine if the team is a winner). In another example, the players may specify other attributes for each ticket 500. For example, in a baseball-themed lottery game, a field position (e.g., pitcher, catcher, first base, left field) and batting order may be specified for each ticket or each number on a ticket. These attributes may be considered when determining if the team is a winner.

With specific reference to step 6D, a determination is performed to see if a qualifying winning event has occurred with respect to the lottery tickets associated with the lottery team. To determine if a lottery team has won as a group, lottery tickets in the group may be compared to the winning lottery numbers. For example, there may be 6 winning lottery numbers for a "Pick 6" lottery drawing. Normally, a single lottery ticket would need to match all 6 of these winning lottery numbers in order to win the jackpot. However, a lottery team may be a winner if each of the 6 winning lottery numbers appears on at least one of the lottery tickets 500 in the team. In a more detailed example, three friends: Alice, Bob, and Carly, may form a lottery team using their 3 lottery tickets 500. This lottery team would be a winner if the 1st and 4th winning lottery numbers (e.g., 32 and 19) appear on Alice's lottery ticket 500, the 2nd, 3rd, and 5th winning lottery numbers appear on Bob's lottery ticket 500, and the 6th winning lottery number appears on Carly's lottery ticket 500. In this example, the team is a winner because all 6 of the lottery numbers each appeared on at least one of the lottery tickets 500 in the team.

In one exemplary embodiment, associated tickets 500 within a lottery team may need to meet certain criteria and/or rules before qualifying for a winning event. According to some embodiments, the criteria may include matching one or more winning lottery numbers (or symbols), matching all of the winning lottery numbers, matching one or more winning lottery numbers in the order they're revealed, matching all of the winning lottery numbers in the order they're revealed, matching one or more numbers from each of the team tickets 500, matching one or more numbers from "X" amount of tickets, wherein X is less than the total number of team tickets 500, matching one or more winning lottery numbers, wherein at least one or more matching numbers are duplicated on another team ticket 500, matching all of the winning lottery numbers, wherein at least one or more matching numbers are duplicated on another team ticket 500, and/or any other ways to mix-and-match aggregated symbols to winning lottery symbols.

In accordance with an exemplary and non-limiting embodiment, a lottery team may be a winner if each of the winning lottery numbers (or symbols) appears on at least one of the lottery tickets 500 in the team.

Note that there may be no additional benefit for a having a winning lottery number appear on multiple lottery tickets. In this case, there may be some strategy in picking numbers for the lottery tickets in the team: It benefits the team if there is no overlap between the numbers on their tickets (i.e., no two lottery tickets in the team have the same number). This benefits the team by increasing the quantity of lottery numbers covered by the team and therefore the odds that one of the winning numbers will appear on at least one of the lottery tickets on the team.

To ensure that the lottery is fair to players who are unaware of this strategy, or players who wish to form a team with overlapping numbers, various remedies may be considered by the lottery operator as described above.

The odds of a team win in a "Pick 6" drawing with 49 possible numbers may be calculated as follows: 49c6=number of possible winning combinations=13,983,816. This means that odds of matching all 6 numbers with a single lottery ticket is=1 in 13,983,816. The table below shows the odds of a team matching the winning numbers based on the number of unique numbers selected by his team. Note that for a team of 3 tickets with non-overlapping numbers (i.e., 18 numbers total), the odds of the team matching the winning number is approximately 1 in 753.

| Quantity of Unique Numbers on Team | Combinations Possible | Odds of Matching the Winning Numbers |
|---|---|---|
| 6 | 1 | 1 in 13,983,816 |
| 7 | 7 | 1 in 1,997,688 |
| 8 | 28 | 1 in 499,422 |
| 9 | 84 | 1 in 166,474 |
| 10 | 210 | 1 in 66,590 |
| 11 | 462 | 1 in 30,268 |
| 12 | 924 | 1 in 15,134 |
| 13 | 1,716 | 1 in 8,149 |
| 14 | 3,003 | 1 in 4,657 |
| 15 | 5,005 | 1 in 2,794 |
| 16 | 8,008 | 1 in 1,746 |
| 17 | 12,376 | 1 in 1,130 |
| 18 | 18,564 | 1 in 753 |
| 19 | 27,132 | 1 in 515 |
| 20 | 38,760 | 1 in 361 |
| 21 | 54,264 | 1 in 258 |
| 22 | 74,613 | 1 in 187 |
| 23 | 100,947 | 1 in 139 |
| 24 | 134,596 | 1 in 104 |
| 25 | 177,100 | 1 in 79 |
| 26 | 230,230 | 1 in 61 |
| 27 | 296,010 | 1 in 47 |
| 28 | 376,740 | 1 in 37 |
| 29 | 475,020 | 1 in 29 |
| 30 | 593,775 | 1 in 24 |

In a similar embodiment, a lottery team may be a winner if each of the winning lottery numbers (or symbols) appears on at least 2 of the lottery tickets in the team. Similarly, each winning lottery number might need to appear on 3 or more of the lottery tickets in the team. Note that in these embodiments, players benefit from having lottery tickets with overlapping numbers.

In accordance with an exemplary and non-limiting embodiment, a lottery team may be a winner if each ticket 500 on the team matches at least a threshold quantity of the winning numbers. For example, in order for a team of 3 lottery tickets 500 to win a prize, each ticket 500 on the lottery team may be required to match at least 2 of the winning lottery numbers.

Note that, in contrast to the example above, in this example it is easier for a team to win if there are fewer people in the team. For example, the odds of a single ticket matching one of the winning numbers is approximately 1 in 8, but the odds of 2 tickets matching one of the winning numbers is closer to 1 in 80 (assuming no overlaps between the tickets).

Also note that overlapping of numbers between different lottery tickets in a team greatly affects the odds of this team embodiment as well. For example, if 2 tickets are identical (i.e., specify the same numbers), then the odds of both tickets matching at least one of the numbers are 1 in 8 (i.e., the same as the odds for a single ticket).

The table below shows some calculations relating to the odds of each ticket in a group matching the winning numbers, which can be used to gauge the approximate difficulty of conditions relating to multiple tickets in a group matching winning numbers.

| Quantity of Winning Numbers | Odds of matching on a single ticket |
|---|---|
| 1 | 8 |
| 2 | 78 |
| 3 | 921 |
| 4 | 14,125 |
| 5 | 317,814 |
| 6 | 13,983,816 |

In one embodiment, the lottery operator controller 106 may enable the transmission of data defining or identifying a lottery ticket 500 or entry and/or team, as well as information defining one or more payout(s) associated with that lottery ticket, a lottery team, or team member to a specific one of the lottery retailer terminals 102. The controller 106 is capable of comparing a team's aggregated data to the appropriate winning lottery numbers to identify matches.

With specific reference to step 6E, a payout for the lottery team is determined. A lottery team with aggregated symbols having a sufficient number of matching lottery numbers, as defined by the particular lottery's rules, may win a prize (typically a monetary prize or even perhaps free play) also as defined by the lottery's rules. In a regular pari-mutuel lottery game, a top prize (or "jackpot") may be awarded when a player matches all six winning lottery numbers. The top prize is often based at least in part on a total number of lottery tickets 500 that have been purchased, and is typically shared when two or more players have matched all six winning lottery numbers. However, in a team play lottery-type game, as described in the current application, there may be other considerations before qualifying for a top prize. For example, since it is easier for team with multiple tickets to combine their symbols to match winning lottery numbers the lottery may further determine other qualifying criteria to be met (as discussed above). In one example, in addition to matching all the winning numbers, the team may also be required to have 6 duplicate symbols within their aggregated symbols. In another example, the team may have to match all winning lottery numbers in the same order they were revealed. These examples are not meant to be limiting in any way.

In one embodiment, various calculations for odds of winning as a group may be performed to determine a payout. The following are some examples:

E.g., 50c6=odds of any one 6 number combination being the winner=1 in 15,890,700

E.g., 49c6=odds of any 6 number combination being a jackpot winner=1 in 13,983,816

E.g., 90c6=odds of any 6 number combination being a jackpot winner=1 in 622,614,630

E.g., 18c6=number of possible combinations from 3 tickets on a team=18,564

E.g., odds of any combination 3 tickets matching the winning 6 numbers=18c6/50c6=1 in 855

In accordance with some exemplary embodiments, a recalculation of odds may be performed while considering other criteria for qualifying for a winning event to determine a payout, thus making it more challenging for the team to qualify for a winning event. Alternatively, in another embodiment, the secondary game for team play may offer a reduced payout, which may be funded by the additional monies earned from team play and/or MMLO.

In an exemplary embodiment, players may keep their original tickets 500 as well as any winnings from those individual tickets 500. For example if a player's individual ticket 500 matches all the winning lottery numbers, then the player is entitled to the base jackpot prize (i.e., the player does not need to share the prize with other team members). However, in one embodiment, the player's ticket symbols may offer additional opportunities within the secondary game and be considered eligible for team play. In some embodiments, the player may receive additional benefits over other team members based upon their contributing symbols.

In one embodiment, the lottery operator controller may enable the transmission of data defining or identifying a lottery ticket or entry, as well as, information defining one or more payout(s) associated with that lottery ticket 500 or entry specific one of the lottery retailer terminals 102.

In an exemplary embodiment, players may pool their tickets 500 into a "best ball" type game, whereby each player in the group may qualify to receive or share a prize amount based on the best-performing ticket 500 from within the group. In a similar embodiment, team players may be ranked according to their contributions to team play.

In one embodiment, the lottery operator controller 106 may enable the transmission of data defining or identifying a lottery ticket 500 or entry and/or team, as well as information defining one or more payout(s) associated with that lottery ticket 500, a lottery team, or team member to a specific one of the lottery retailer terminals 102. The controller 106 is capable of comparing a team's aggregated data to the appropriate winning lottery numbers to identify matches.

In an exemplary embodiment, a ticket holder or team members may share a team prize equally regardless of individual contributions from lottery tickets. In another embodiment, a ticket holder or team members may receive more or less shares of team prizes based on individual contributions from lottery tickets 500. For example, if a player contributed more matching symbols to the team the player may be eligible for a larger share of the team prize. In another example, a player contributing the most tickets to a team play may be eligible for a larger share of the team prize (regardless of the amount of matching symbols). In yet another embodiment, a team captain or creator of a team may be eligible for a larger share of the team prize In one embodiment, the lottery operator controller 106 may enable the transmission of data defining or identifying a lottery ticket 500 or entry and/or team, as well as information defining one or more payout(s) associated with that lottery ticket 500, a lottery team, or team member to a specific one of the lottery retailer terminals. The controller 106 is capable of comparing a team's aggregated data to the appropriate winning lottery numbers to identify matches.

With reference to step 6F, lottery team members are provided with a prize. In accordance with another exemplary embodiment, lottery players (e.g., individual winners, ticket holders from a team, etc.) may be provided with a payout after presenting lottery tickets 500. According to some exemplary embodiments, the payouts may be provided via a lottery retailer terminal 102, a lottery kiosk, a lottery operator controller 106, and/or a lottery agent. For example, a lottery agent may receive a lottery ticket with MMLO from a player and insert into a lottery terminal. A state lottery facility may provide players and/or teams with larger payouts.

In accordance with another exemplary embodiment, multiple players may participate in a single, collaborative lottery entry with a shared payout. For example, six players could collaborate, each picking one number on a six-number lottery ticket 500. Any resulting payout would then be shared among all members of the group. The collaborative entry could be created and managed online via the lottery web site. In addition, bonuses could be provided to individual members based on their individual contributions toward the overall success of the lottery entry as a whole.

In accordance with another exemplary embodiment, one or more tickets in a Mix-and-Match Group may be owned/purchased by the same player. For example, a player groups his ticket #1 with his ticket #2 becoming, in effect, his own group member. In such a case, there is no need to divide the group prize, since it is all paid to the same person.

In accordance with another exemplary embodiment, a separate prize pool may be used for paying out Mix-and-Match winners, thereby avoiding diluting the prize payouts to regular winners. In such an event, it may cost more to the lottery authority to administer and pay out such prizes.

Many lottery players enjoy fantasizing about things they would buy for themselves and for others should they win the lottery. In accordance with exemplary and non-limiting embodiments, lottery game players may record information, such as in lottery player database 326, that specifies how lottery winnings are to be dispensed. In some embodiments, a registration process may be used by a facilitator (e.g. a state lottery service provider) to determine information associated with a gift provider, such as a lottery player. Information obtained during registration may be used in a process of indicating a potential gift (e.g. to be provided if/when a registrant/player obtains a sufficient lottery payout) to a gift recipient according to one or more of the embodiments of the disclosure. Information associated with a gift provider may be received by: a facilitator, a lottery authority, a lottery retailer, or a third party.

Figure 7:
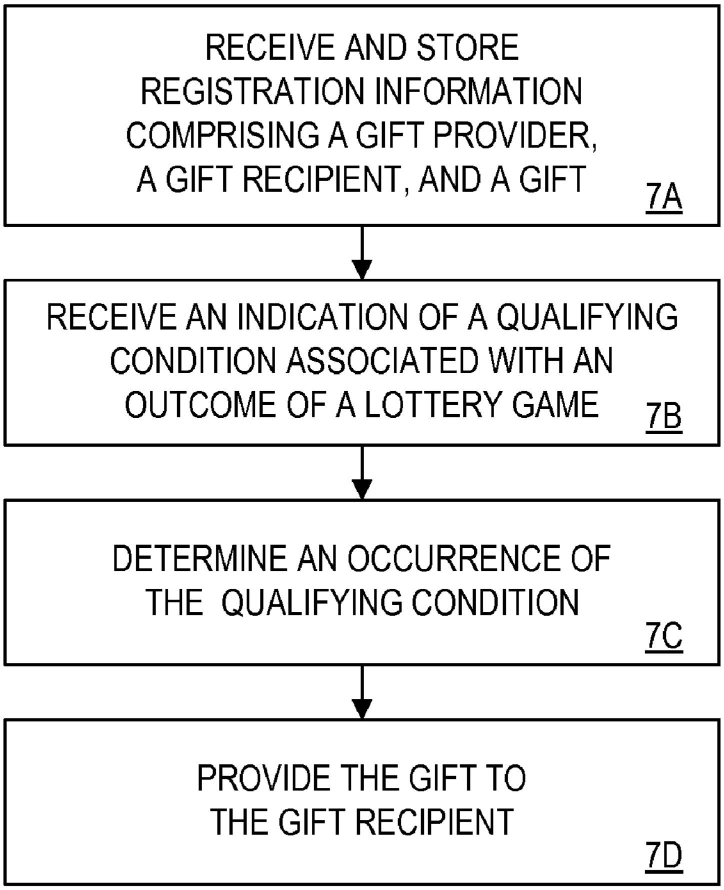
FIG. 7 is a flowchart of an exemplary and non-limiting embodiment of a method according to the disclosure.

With reference to FIG. 7, there is illustrated a flowchart of an exemplary and non-limiting embodiment in accordance with the disclosure. At step 7A, registration information is received and stored comprising information related to a gift provider, a gift recipient, and a gift. At step 7B, an indication of a qualifying condition associated with an outcome of a lottery game is received. At step 7C, there is determined the occurrence of the qualifying condition. Lastly, at step 7D, once the occurrence of the qualifying condition has been determined, the gift is provided to the gift recipient.

With reference to step 7A, registration information may be collected, for example, via a website that prompts a registrant to enter their information or via a cashier at a merchant who collects a registrant's information at a lottery retailer terminal 102. The registration information may be stored, for example, in registration information database 328.

A facilitator may receive an indication of a gift recipient from a registrant and/or a third party. In one embodiment, a gift provider may indicate a plurality of individual gift recipients, as well as identifying information associated with each recipient. For example, a gift provider may list the names, usernames and/or email addresses of ten friends which he intends to provide gifts to, if he should win the lottery.

In one or more embodiments, an indication of a gift to be provided to a gift recipient may be received from a gift provider. In one example, a gift provider may select a gift from a list or sequence of menus displayed on a website. In another example, a custom gift may be generated entirely or in part by a gift provider. Selection or generation of a custom gift may take place prior to, during, and/or following a registration process.

In another embodiment, a gift provider may select a gift from one or more suggestions received from a potential gift recipient. For example, a gift recipient may create a wish-list of gifts they would like and forward the list on to at least one potential gift provider. The potential gift provider may select one or more gifts on the list to provide, or may use the wish-list to get an idea of what the gift recipient would like to receive and ultimately, choose their own gift to provide. In a variation of this exemplary embodiment, a registrant may post a wish list on their profile, allowing any potential gift providers to view the gifts he or she is interested in receiving.

With reference to step 7B, a facilitator (and/or another party) may receive an indication of a condition that must be satisfied in order to initiate the provision of a gift to a gift recipient. For example, a condition may comprise or include a gift provider winning at least $X million as a result of a lottery drawing, and such condition may be met prior to initiating the provision of a gift to a gift recipient.

In other exemplary embodiments, a facilitator, lottery authority, gift recipient, gift provider or third party may determine that a condition associated with providing a gift has been met. For example a gift provider may indicate to a facilitator that he just won a jackpot of $2 million which would satisfy a condition of a $1 million minimum win. In another example, a gift recipient may indicate to a facilitator that a gift provider has just won a lottery payout of over $25 million. In yet another example, a gift provider may be able to register lottery entries with a facilitator or lottery authority and a controller 106 may automatically determine if entries are winners and notify a facilitator if any winning lottery outcome satisfies a condition for providing a gift.

With reference to step 7C, the controller 106 may aid in determining if a condition for providing a gift has been met. For example a controller may query a database to determine the status of one or more conditions associated with providing a gift to be provided pursuant to winning a lottery payout. In another example, a gift provider may indicate his lottery entries to the facilitator and the facilitator may determine which, if any, of the lottery entries are winners. This service may help gift providers to avoid accidentally discarding, losing, or not redeeming lottery entries that are winners.

With reference to step 7D, a facilitator may assist in providing a gift to a gift recipient. For example, a facilitator may instruct a lottery authority that a lottery winner (e.g., gift provider) has entered into one or more binding or non-binding agreement(s) to provide a gift to a gift recipient. The lottery authority may withhold a portion of the lottery winnings in order to ensure that the gift provider is able to purchase all agreed upon gifts.

Numerous embodiments have been described, and are presented for illustrative purposes only. The described embodiments are not intended to be limiting in any sense. The disclosure is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present disclosure. Accordingly, those skilled in the art will recognize that the present disclosure may be practiced with various modifications and alterations. Although particular features of the present disclosure may be described with reference to one or more particular embodiments or figures that form a part of the present disclosure, and in which are shown, by way of illustration, specific embodiments of the disclosure, it should be understood that such features are not limited to usage in the one or more particular embodiments or figures with reference to which they are described. The present disclosure is thus neither a literal description of all embodiments of the disclosure nor a listing of features of the disclosure that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the disclosure" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present disclosure.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the embodiments of the disclosure, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present disclosure need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present disclosure. In addition, the databases may, in a known manner, be stored locally or remotely from a device that accesses data in such a database.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning. Finally, unless a claim element is defined by reciting the word "means" and a function without reciting any structure, it is not intended that the scope of any claim element be interpreted based on the application of 35 U.S.C. §112, sixth paragraph.

Although the disclosure has been presented with respect to preferred embodiments thereof, those skilled in the art will note that various substitutions and modifications may be made to those embodiments described herein without departing from the spirit and scope of the present disclosure.

What is claimed:

1. A non-transitory computer readable medium encoded with instructions for directing a processor to:

receive and store registration information comprising a gift provider, at least one gift recipient, and at least one gift associated with each of the at least one gift recipient;

receive an indication of a qualifying condition associated with an outcome of a lottery game;

determine the occurrence of the qualifying condition; and provide the at least one gift to the at least one gift recipient.

2. The non-transitory computer readable medium of claim 1 wherein the gift provider is a player of the lottery game.

3. The non-transitory computer readable medium of claim 1 wherein at least one of the at least one gift is selected by one of the at least one gift recipient.

4. The non-transitory computer readable medium of claim 1 wherein at least one of the at least one gift is selected by the gift provider.

5. The non-transitory computer readable medium of claim 1 wherein the at least one gift is provided to the at least one gift recipient via a facilitator.

6. A method comprising:

receiving, via a computing device in communication with a network, and storing registration information comprising a gift provider, at least one gift recipient, and at least one gift associated with each of the at least one gift recipient;

receiving, via the computing device, an indication of a qualifying condition associated with an outcome of a lottery game;

determining, via the computing device, the occurrence of the qualifying condition; and providing, via the computing device, the at least one gift to the at least one gift recipient.

7. The method of claim 6 wherein the gift provider is a player of the lottery game.

8. The method of claim 6 wherein at least one of the at least one gift is selected by one of the at least one gift recipient.

9. The method of claim 6 wherein at least one of the at least one gift is selected by the gift provider.

10. The method of claim 6 wherein the at least one gift is provided to the at least one gift recipient via a facilitator.

11. An apparatus comprising:

a processor; and a non-transitory computer readable medium in communication with the processor, the non-transitory, computer readable medium being encoded with instructions for directing the processor to perform:

receiving and storing registration information comprising a gift provider, at least one gift recipient, and at least one gift associated with each of the at least one gift recipient;

receiving an indication of a qualifying condition associated with an outcome of a lottery game;

determining the occurrence of the qualifying condition; and providing the at least one gift to the at least one gift recipient.

12. The apparatus of claim 11 wherein the gift provider is a player of the lottery game.

13. The apparatus of claim 11 wherein at least one of the at least one gift is selected by one of the at least one gift recipient.

14. The apparatus of claim 11 wherein at least one of the at least one gift is selected by the gift provider.

15. The apparatus of claim 11 wherein the at least one gift is provided to the at least one gift recipient via a facilitator.

* * * * *